(12) United States Patent
Varekamp (10) Patent No.: US 8,515,172 B2
(45) Date of Patent: Aug. 20, 2013

(54) SEGMENTATION OF IMAGE DATA (75) Inventor: Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 381 days.

(21) Appl. No.: 12/809,239

(22) PCT Filed: Dec. 15, 2008

(86) PCT No.: PCT/IB2008/055286
§ 371 (c)(1),
(2), (4) Date: Jun. 18, 2010

(87) PCT Pub. No.: WO2009/083854
PCT Pub. Date: Jul. 9, 2009

(65) Prior Publication Data
US 2011/0002541 A1    Jan. 6, 2011

(30) Foreign Application Priority Data

Dec. 20, 2007  (EP) .................................... 07123756

(51) Int. Cl.
*G06K 9/34*   (2006.01)
(52) U.S. Cl.
USPC ........................................................ 382/173
(58) Field of Classification Search
USPC ................ 382/103, 106–107, 154, 164–165, 382/171, 173, 175–181, 190, 199, 274, 294–295; 345/419, 422, 629, 581, 582; 348/42, 43, 348/51
See application file for complete search history.

(56) References Cited

U.S. PATENT DOCUMENTS

| 5,379,369 | A | 1/1995 | Komma et al. |
| 6,504,569 | B1 * | 1/2003 | Jasinschi et al. ................ 348/43 |
| 6,526,169 | B1 | 2/2003 | Murching et al. |

(Continued)

FOREIGN PATENT DOCUMENTS

| JP | 62222372 A | 9/1987 |
| JP | 5068268 A | 3/1993 |
| JP | 10200752 A | 7/1998 |

(Continued)

OTHER PUBLICATIONS

C. Oliver et al, "Understanding Synthetic Aperture Radar Images", Artech-House, 1998, pp. 208-212.

(Continued)

*Primary Examiner* — Jose Couso (57) ABSTRACT

A method of processing image data comprises receiving image data, segmenting the image data using a first criteria and a first threshold to create a first segmented view of the image data, segmenting the image data using the first criteria and a second threshold to create a second segmented view of the image data, displaying the first segmented view of the image data, receiving one or more selection user inputs selecting one or more segments of the image data, as displayed in the first segmented view, receiving a defined user input, displaying the second segmented view of the image data, and receiving one or more further selection user inputs selecting one or more segments of the image data, as displayed in the second segmented view. This method can be used in the creation of a depth map. In this case, the process further comprises receiving one or more depth user inputs, the or each depth user input relating to a respective selection user input, and creating a depth map for the image data accordingly.

23 Claims, 8 Drawing Sheets

(56) References Cited

U.S. PATENT DOCUMENTS

| | | | |
|---|---|---|---|
| 6,556,704 B1* | 4/2003 | Chen | 382/154 |
| 6,847,728 B2* | 1/2005 | Tao et al. | 382/106 |
| 7,035,451 B2 | 4/2006 | Harman et al. | |
| 7,245,766 B2 | 7/2007 | Brown et al. | |
| 7,262,767 B2 | 8/2007 | Yamada | |
| 2002/0012466 A1 | 1/2002 | De Long | |
| 2004/0032488 A1 | 2/2004 | Harman | |
| 2005/0031202 A1 | 2/2005 | Accomazzi et al. | |
| 2005/0111734 A1 | 5/2005 | Watanabe | |

FOREIGN PATENT DOCUMENTS

| | | | |
|---|---|---|---|
| JP | 2001005978 A | 1/2001 | |
| JP | 2001307087 A | 11/2001 | |
| JP | 2002123842 A | 4/2002 | |
| JP | 2002366963 A | 12/2002 | |
| JP | 2004078432 A | 3/2004 | |
| JP | 2005149439 A | 6/2005 | |
| JP | 2005293367 A | 10/2005 | |
| JP | 2006519635 A | 8/2006 | |
| WO | 0139125 A1 | 5/2001 | |
| WO | 2004051573 A2 | 6/2004 | |
| WO | 2006056614 A1 | 6/2006 | |

OTHER PUBLICATIONS

Phil Harman et al, "Rapid 2D to 3D Conversion", Proceedings of the SPIE, vol. 4660, January 21, 2002, pp. 78-86.

Richard O. Duda et al, "Iterative Optimization", Pattern Classification, Chapter 10, John Wiley and Sons, Inc. New York, 2001, pp. 548-549.

Andrzej Sluzek, "Multi-Level Contour Segmentation Using Multiple Segmentation Primitives", Pattern Recognition, 1998, Vol. 1 Aug. 16, 1998, pp. 741-743.

Joshua E. Cates et al, "Case Study: An Evaluation of User-Assisted Hierarchical Watershed Segmentation", Medical Image Analysis, Oxford University Press, Vol. 9, No. 6, Dec. 1, 2005, pp. 566-578.

Zhang et al, "An Image Segmentation Framework Based on Patach Segmentation Fusion", 18th International Conference on Pattern Recognition Sep. 2006, 4 Pages.

B. Marcotegui et al, "A Video Object Generation Tool Allowing Friendly User Interaction", Image Processing, Oct. 1999, vol. 2, pp. 391-395.

Sriram Dayanand et al, "A Particle System Model for Comgining Edge Information From Multiple Segmentation Modules", CVGIP Graphical Models and Image Processing, Vol. 56, No. 3, May 1, 1994, pp. 219-230.

Bryan C. Russell, "Using Multiple Segmentations to Discover Objects and Their Extent in Image Collections", Computer Vision and Pattern Recognition, 2006, Vol. 2, Jun. 17, 2006, pp. 1605-1614.

* cited by examiner

SEGMENTATION OF IMAGE DATA

FIELD OF THE INVENTION

This invention relates to a method, system and computer program product for processing image data.

BACKGROUND OF THE INVENTION

The provision of three-dimensional viewing devices such as 3D televisions is on the rise. Such devices tend to generally fall into one of two categories. The first category is that of stereoscopic devices, which allow the user to perceive a three-dimensional image by wearing special glasses. The glasses that the user wears ensure that each eye sees a different image, which are slightly different views of the same scene with the viewpoint spaced apart by a short distance, mimicking the distance that the user's eyes are spaced apart. The user's brain processes these two images to create a three-dimensional image. The second category of display devices comprises auto-stereoscopic display devices, which produce a three-dimensional effect, without the user having to wear any special glasses. These devices work by projecting multiple views from the display, which again ensures that each eye of the user sees a different image. One way that this can be achieved is for a lenticular optical array to be overlaid on a conventional display device, to produce the multiple views of the image.

The availability of content for use by auto-stereoscopic display devices is important for the market acceptance thereof. In order for an auto-stereoscopic display device to produce a satisfactory video output, a depth map needs to be available for each frame in the video. The depth map and the original frame are used to generate the multiple views required by an auto-stereoscopic display. As video sequences comprise many frames per second, e.g. the PAL scheme has a frame rate of 25 frames per second, production of the required depth maps for image sequences is not a trivial task.

The availability of high quality 3D video is important for the success of 3D television. At present both three-dimensional video capture as well as conversion of existing or newly acquired 2D video to 3D video by adding depth is being investigated by various companies. A well known conversion method is to assign depth at key-frames using manual input via a graphical editor and then to automatically propagate this depth information for the duration of a video shot (typically a few seconds). Automatic propagation is maturing rapidly but manual assignment of depth at key-frames (using an editor) is still slow (the user typically draws polygons for which a depth profile is specified) and therefore costly.

Assigning depth at key-frames is currently often done using common graphical editors. Very often only a polygon drawing tool is used to select regions to which a constant depth or a depth profile is assigned. This process is slow since the user must position the cursor close to the object contour using the mouse. Typically many mouse-clicks are needed to accurately align the curve with the object.

In another field of image processing, automatic segmentation is proposed to aid selection "Understanding Synthetic Aperture Radar Images", C. Oliver, S. Quegan, Artech-House, 1998. This selection method may be used to partition an image into square regions and then automatically align region edges with object boundaries using region fitting. This technique is very similar to clustering of data shown in "Pattern Classification", Richard O. Duda, Peter E. Hart, and David G. Stork, John Wiley and Sons, Inc., New York, 2001, but with the difference that it incorporates boundary regularity in a global optimization criterion. This makes it easier to avoid irregular edges due to noise.

Selecting regions with the cursor and then assigning depth to a region is an obvious way in which an automatically generated segmentation can help to produce a depth map. However selecting the number of regions in the segmentation is difficult. To avoid missing important contours, many small regions are needed. On the other hand, large regions allow faster depth assignment. As selecting the best possible segmentation remains an issue manual demarcation of selections is still widely used.

SUMMARY OF THE INVENTION

It is an object of the invention to improve upon the known art and improve the selection process.

According to a first aspect of the present invention, there is provided a method of processing image data comprising: segmenting the image data using a first criterion and a first parameter to create a first segmented view of the image data, segmenting the image data using the first criterion or a second criterion and a second parameter to create a second segmented view of the image data, displaying the first segmented view of the image data, receiving one or more selection user inputs selecting one or more segments of the image data, as displayed in the first segmented view, displaying the second segmented view of the image data, and receiving one or more further selection user inputs selecting one or more segments of the image data, as displayed in the second segmented view.

According to a second aspect of the present invention, there is provided a system for processing image data comprising: a processor arranged to segment the image data using a first criterion and a first parameter to create a first segmented view of the image data, and to segment the image data using the first criterion or a second criterion and a second parameter to create a second segmented view of the image data, a display device arranged to display the first and second segmented views of the image data, and a user interface arranged to receive one or more selection user inputs selecting one or more segments of the image data, as displayed in the first segmented view, and to receive one or more further selection user inputs selecting one or more segments of the image data, as displayed in the second segmented view.

According to a third aspect of the present invention, there is provided a computer program product on a computer readable medium for processing image data, the product comprising instructions for: segmenting the image data using a first criterion and a first parameter to create a first segmented view of the image data, segmenting the image data using the first criterion or a second criterion and a second parameter to create a second segmented view of the image data, displaying the first segmented view of the image data, receiving one or more selection user inputs selecting one or more segments of the image data, as displayed in the first segmented view, displaying the second segmented view of the image data, and receiving one or more further selection user inputs selecting one or more segments of the image data, as displayed in the second segmented view.

Owing to the invention, it is possible to provide a tool that can be used to select segmented regions of image data (such as from a video frame or still image). The method and system provide help to the user by presenting multiple segmentations at different region merge levels. Although the present invention can be used in combination with two segmented views based on two pre-determined merge levels, preferably the user can interactively adjust the merge level to prevent that a single region contains different objects. The type of applications that the invention can be used for include semi-automatic production of 3D video using monoscopic (2D) video as input, as well as for the generation of 3D still images using 2D still images. In addition the invention can also be used for providing a selection tool in a general image editing software for interactive (pixel-based) image processing. The present invention effectively provides a manner to select from that segmentation that best suits a particular selection, rather than attempting to segment an image in an optimal manner for selection.

Preferably the method further comprises combining the one or more selected segments from the first segmented view with the one or more selected segments from the second segmented view. The underlying idea is to allow the user select segments to be added to the selection or to be subtracted from the selection, first based on the first segmented view. For example by left clicking on a segment it is added to the selection, by right clicking it is removed from the selection.

Subsequently this selection can be amended by adding or subtracting segments from the selection based on the second segmented view. For example by left clicking on a segment it is added to the selection, by right clicking it is removed from the selection. The selection boundaries of the resulting selection can coincide with partial or full segment boundaries from the first and partial or full segment boundaries of the second segmented view.

Preferably the process further comprises receiving one or more depth user inputs, the or each depth user input relating to a respective selection user input, and creating a depth map for the image data accordingly. The system can be further arranged to display the depth map alongside a segmented view of the image data. The system and method delivered by the invention lend themselves very well to a development tool for the creation of a depth map.

Preferably the process further comprises receiving a defined user input after selecting a segment from the first segmented view, the defined user input triggering displaying the second segmented view. In this manner the user can switch between different levels of segmentation and/or segmentation criteria and can select segments in the different views according to their requirement. Since no segmentation algorithm will ever produce the exact segmentation that the user wishes to see for creating a depth map, the tool provides a simple and efficient method of creating the depth map by allowing the user to select the proper level of segmentation and/or segmentation criteria.

Advantageously, when the first and second segmented view are both based on the first criterion, the method further comprises segmenting the image data using a second criterion and a third parameter to create a third segmented view of the image data, receiving a further defined user input, displaying the third segmented view of the image data, and receiving one or more further selection user inputs selecting one or more segments of the image data, as displayed in the third segmented view. In this manner the present invention effectively allows switching between segmentation levels of data as well as between segmentation criteria of data.

This concept is best illustrated by considering two such segmentation criteria, color and motion. If the image data is segmented by color, then the user is able to adjust the level of segmentation when completing a task such as creating a depth map. However, the user can also switch the segmentation view to "motion" rather than "color" which will segment the image according to this criterion. For example a moving football in an image will be highly segmented according to color segmentation, but when switching to "motion" segmentation, the football will no longer be highly segmented, because it is a single moving object. As the pixels of an object typically have a similar depth value, this manner of selection enables the user to select all pixels of the objects using a small, or the smallest, number of user inputs. In this manner annotating depth values to objects can be simplified substantially. Examples of the criterion that could be used for segmentation are color, segment size (for instance merging segments smaller than a fixed threshold with the neighbor segment that is most similar in colour), luminance, chrominance, motion and texture, all of which can be readily extracted from an image.

BRIEF DESCRIPTION OF THE DRAWINGS

Embodiments of the present invention will now be described, by way of example only, with reference to the accompanying drawings, in which.

DETAILED DESCRIPTION OF EMBODIMENTS

Figure 1:
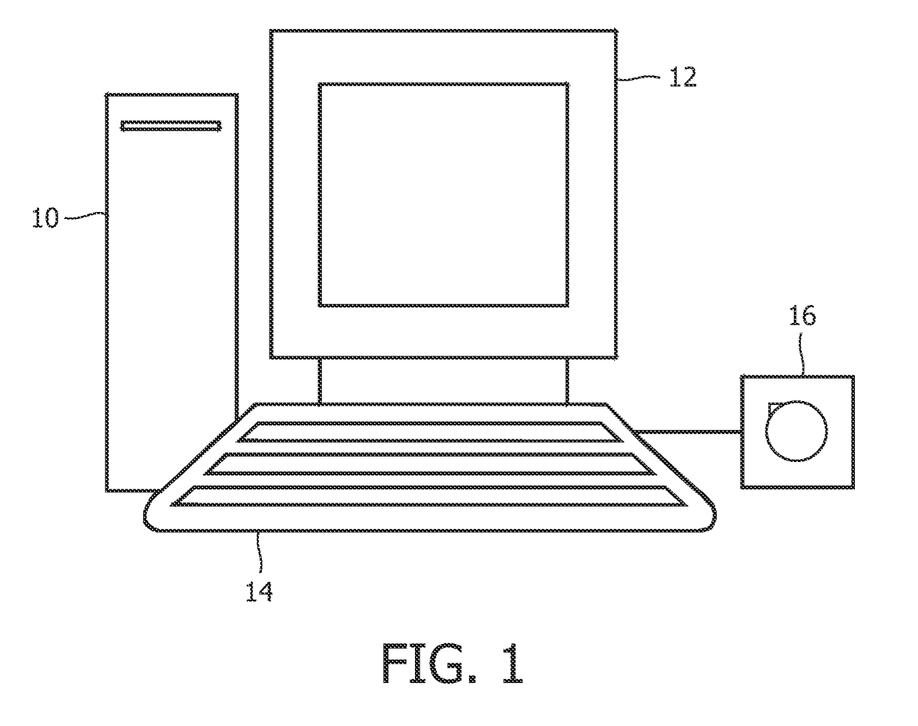
FIG. 1 is a schematic diagram of a system for processing image data.

FIG. 1 shows a system that can be used to process image data. The system includes a processor 10, a display device 12 and a user interface comprising a keyboard 14 and a dial 16 (the function of which will be explained in more detail below). The user interface could also include a touch-screen component of the display device 12, which allows efficient selection of segments. The system of FIG. 1 can be configured around a conventional desktop PC, a tabletop PC, a touch tablet with built in display, or could be a professional (graphical) workstation specifically configured for the task of processing the image data. The system is a tool to assist a user who is handling image data. The processor 10 is performing segmentation of image data, for the user to utilise in their present application. In the description below, an example will be illustrated on the basis that the user is using the tool to assist in the creation of a depth map.

Figure 2:
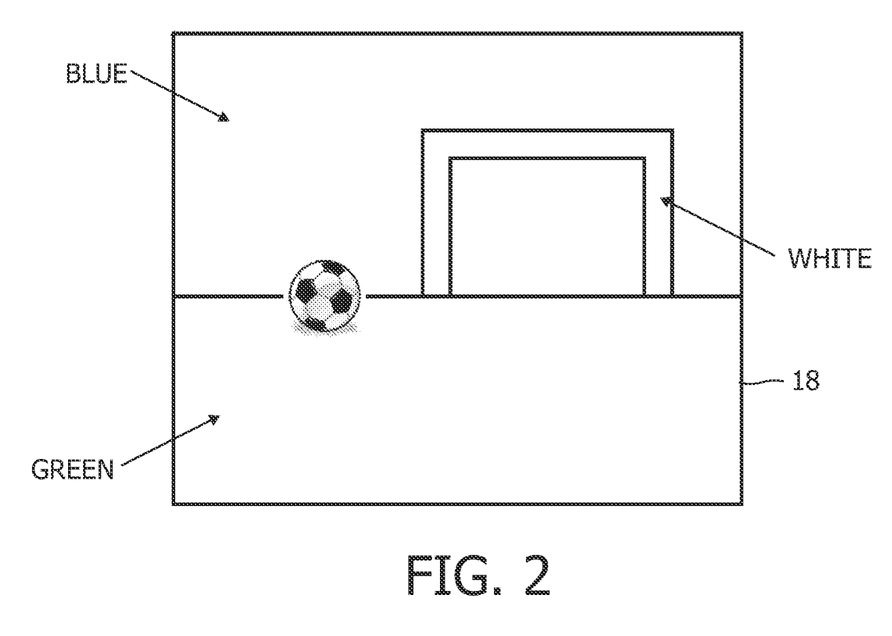
FIG. 2 is a schematic diagram of a frame of image data.

In order to explain the concept of segmentation, FIG. 2 shows a highly stylised frame of image data 18. The image data 18 shows blue sky, green grass, white goalposts and a multicolored football, which is the only component of the image that is in motion. Obviously the image frame 18 represents a stationary single scene, but the frame 18 will comprise one of a sequence of frames that constitute a video signal, and the football is moving relative to its position in the previous frame. The camera that has recorded the image frame 18 is stationary.

An image can be segmented by an algorithm run by a processor, such as the processor 10 of the processing system. There are two concepts relating to segmentation, which are the segmentation criterion employed, and the segmentation parameter (which may be a threshold) that is applied. Many different criteria are possible, including color, segment size, luminance, chrominance, motion and texture. All of these criteria can be detected in the data that form the image frame 18. For example, if color is to be used as the segmentation criterion for data 18 using a threshold as a segmentation parameter, then pixels within the image data 18 that have the same or similar color will be considered to be in the same region. The threshold applied determines whether two adjacent pixels are considered to be similar or not. Assuming that two adjacent pixels have identical blue and green values, but their red values differ by 10, then the threshold determines whether they are judged to belong to the same region. Setting the threshold high or low determines whether the image data 18 is segmented into smaller or larger numbers of regions. It will be clear to the skilled person that segmentation as such is not limited to the RGB color space.

Many different segmentation parameters are envisaged ranging from a single threshold value for all luminance values, to luminance dependent threshold values, to differentiated thresholds for individual color components. A simple manner to obtain a range of segmentations using a single segmentation criterion is to create a fine grained segmentation using a particular criterion and subsequently merging segments to obtain coarser segments. Subsequently selection of a segmented view from the range of segmented views could be based on a parameter indicative of the merge level. A user browsing through such segments would perceive the selected views as being the result of merging or splitting the segments that exist in the segmentation views of the image data 18.

Figure 3:
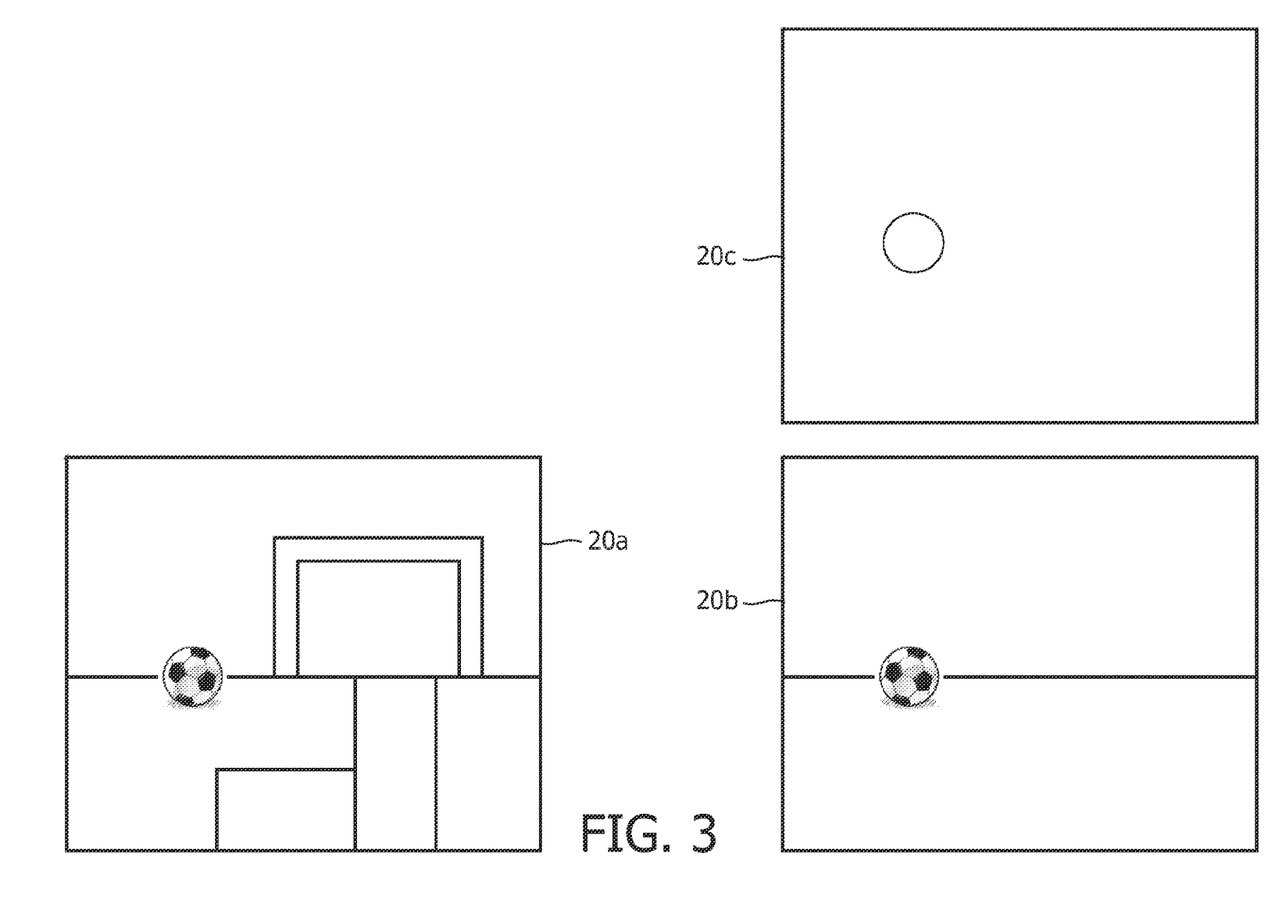
FIG. 3 is a schematic diagram showing three different segmentation views of the frame of image data of FIG. 2.

The method of processing the image data 18 carried out by the system of FIG. 1 comprises receiving the image data 18, and then segmenting the image data 18. FIG. 3 shows three different segmented views 20a, 20b and 20c of the image data 18 of FIG. 2. These will be displayed one at a time, to the user, on the display device 12, with the user being able to switch between the views as the desire. Alternatively, the views 20 could be displayed simultaneously to the user, with the user able to switch between the current segmentation view 20 through an appropriate user interface action.

The processor 10 has segmented the image data 18 using a first criterion and a first threshold to create the first segmented view 20a of the image data 18, segmented the image data 18 using the first criterion and a second threshold to create the second segmented view 20b of the image data 18, and segmented the image data 18 using a second criterion and a third threshold to create the third segmented view 20c of the image data 18. In this example, the first criterion is color, and the second criterion is motion. The second segmentation view 20b can be created by merging segments of the view 20a together according to the parameter level.

As will be seen from FIG. 3, none of the segmented views 20 on their own provide an ideal segmentation of the image data 18. Providing the user with the ability to combine information from multiple segmented views 20 in a seamless manner provides an efficient methodology for the user to access the different components at the correct granularity. Essentially, there are four objects within the image data 18, the ground, the sky, the football, and the goalposts. The user desires to create a depth map for this image data 18, and needs to be able to assign four different depth values, one to each object. In the prior art solutions, either the user assigns depth values manually by creating regions, using software, in the image data 18, or a single segmentation is performed that is then amended by the user.

However, the different views 20 produced by the processor 10 support the user in creating a depth map, in an easier and more accurate fashion than can currently be achieved. The first segmented view 20a is a segmentation based upon the criterion of color, with a low threshold. In this view, the ball is heavily segmented, and the green grass is also over-segmented (implying that the threshold has detected different shades of green within the grass). In practice, the regions produced within the grass by the segmentation would not be regular rectangles; this is used to illustrate the concept of segmentation into regions. However, the first view 20a is needed to distinguish the sky from the goalposts. As can be seen in the second segmentation view 20b, which uses color for segmentation, but with a higher threshold, the grass has now been merged into a single region, but the sky and goalposts are also combined to a single region. The ball is still heavily segmented. In a system providing sequential access to multiple segmented views based on multiple segmentation criteria the user has the option to change to the second segmentation criteria (here motion), which is the view of FIG. 20c. In this case the only moving object, the ball, is a single region.

By moving through the different views 20, the user can create the depth map. Effectively, this is achieved by displaying the first segmented view 20a of the image data 18, receiving one or more selection user inputs selecting one or more segments of the image data 18, as displayed in the first segmented view 20 (for example selecting first the sky and then the goalposts), receiving a defined user input to switch the view, displaying the second segmented view 20b of the image data 18, and receiving one or more further selection user inputs selecting one or more segments of the image data 18, as displayed in the second segmented view 20b (the ground). The image data 18 is segmented using the second criterion (motion) and a third threshold to create the third segmented view 20c of the image data 18, and after receiving a further defined user input to switch the view, there is displayed the third segmented view 20c of the image data 18, and the user interface receives one or more further selection user inputs selecting one or more segments of the image data 18 (the ball), as displayed in the third segmented view 20c.

Since an "optimal" segmentation of the original image data 18 cannot be produced, the system presents the user of the depth editor with a fast selection mechanism to switch between multiple pre-computed segmentations. By displaying multiple alternative segmented views at the same location, the user can focus on one particular part of an object or image, and switch segmentations until a matching segment is found. Compared to a scenario wherein multiple segmentations are displayed simultaneously in different locations, this represents a substantial improvement.

On the other hand visualizing multiple segmented views in parallel can be useful in assessing which particular segmentation provides a good starting point for such annotation. Thus displaying multiple segmentations based on different segmentation criteria in parallel provides other benefits.

Figure 4:
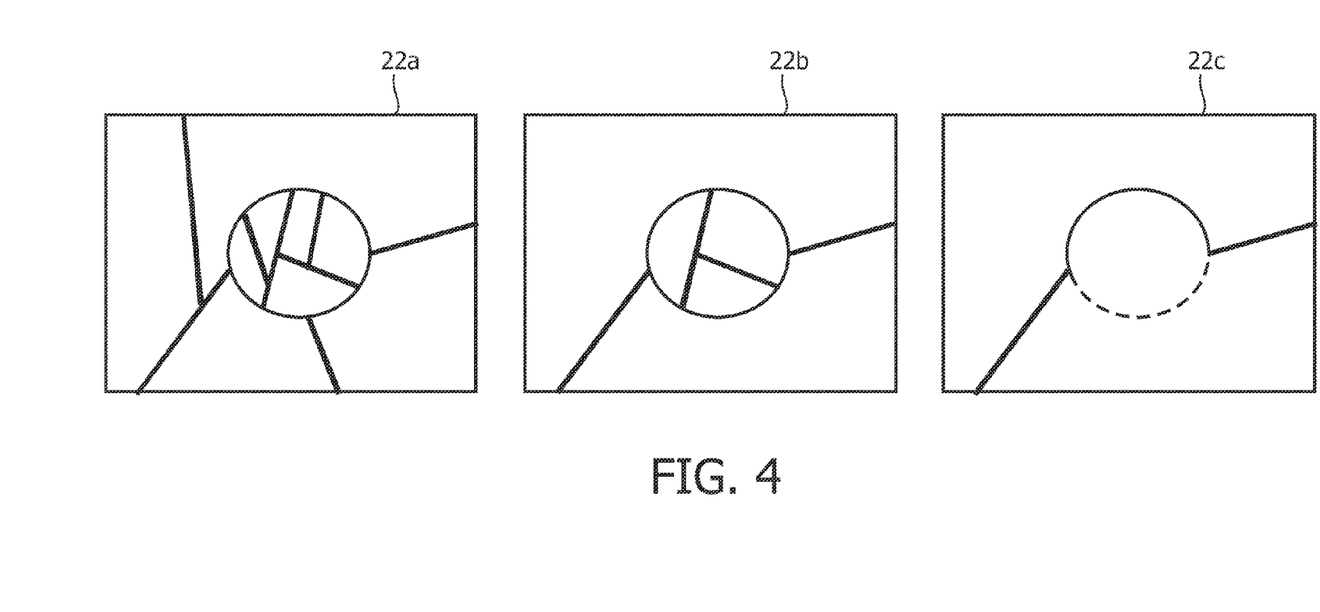
FIG. 4 is a schematic diagram showing three different segmentation views of further image data.

In FIG. 3, only two different segmentation views 20a and 20b were computed with the criteria of color, this is however exemplary only and in practice it may be useful to have a larger number of segmented views to choose from. This is illustrated in FIG. 4, which shows segmentation views 22a, 22b and 22c of image data 18. In FIG. 4 there is shown an example usage of the proposed editor for depth map creation. Views 22a to 22c are segmentations at different region merge levels. A constant depth is assigned to a person in the picture by selecting regions at different merge levels and adjusting the depth value per region or group of regions.

The central view 22b can be considered the default view of the image data 18, and the user can use the left-arrow key on the keyboard 14 to view the left image 22a, and can, in a similar way, use the right-arrow key on the keyboard 14 to view the right image 22c. In this way a simple and straight forward selection mechanism is presented to the user of the depth editor. The middle picture 22b will be used to assign depth to the circle since it is most efficient (only three regions need to be selected). By pressing the right arrow key (→) regions with similar color are merged (the circle merges with another object). By pressing the left arrow key (←) the merged regions are split into more parts (selecting the circle requires selection of five regions). The user can thus use the appropriate granularity to assign depth to objects. In reality, particularly with a criterion such as color, used for the segmentation, it is possible to use a large number of different views, which the user can cycle through. To this end, the dial 16 of FIG. 1 is provided, which allows the user to "tune" to the correct level of granularity for the task (or sub-task) that they are currently performing.

To provide the views 20 and 22 for use by the tool, an initial segmentation is made using, for instance region fitting, as described in the paper by Oliver referred to above. This initial segmentation $S_1$ contains many small regions to make sure that all important depth discontinuities coincide with region edges. Subsequent segmentations $S_2 \ldots S_{10}$ are created by increasingly merging regions of $S_1$. The first merged segmentation $S_2$ is created by merging all adjacent regions ($R_i$, $R_j$) in $S_1$ for which:

$$|r_i - r_j| + |g_i - g_j| + |b_i - b_j| < T_1$$

where ($r_i$, $g_i$, $b_i$) and ($r_j$, $g_j$, $b_j$) are the mean color vectors of regions $R_i$, and $R_j$ respectively. A typical value of the merge threshold is $T_1 = 10$. The new mean color vectors are now computed for the merged regions. The second merged segmentation $S_3$ is calculated from $S_2$ using the same procedure but using a merge threshold $T_2$. This process is continued until segmentation $S_{10}$ has been created. In one embodiment, the threshold is increased by 10 for each new merge level. In this case $T_{10} = 100$. This segmentation process can be carried out prior to any work by the user, or could be carried out on the fly, as the user is selecting new views by pressing the left and right arrow keys (in the embodiment of FIG. 4). Indeed, the user could request an intermediate segmentation to be carried out, for example for a new view between 22a and 22b of FIG. 4, if neither view is suitable for the current work that the user is doing. This new view 22 is created there and then by carrying out segmentation using a new threshold in-between that used in respect of the two views 22a and 22b.

FIG. 4 shows how three different segmentation merge levels are used to produce a depth map by the user selecting segments, for example with an on-screen cursor. In view 22c large segments can be selected with a single mouse click. However, part of the background may be wrongly placed in the foreground. This can be partially corrected in view 22b by moving to a segmentation at a lower merge level. However, it may still be the case that a small part of the background is still placed in the foreground. This error is corrected by selecting a segmentation that has an even lower merge level (view 22a).

Figure 5:
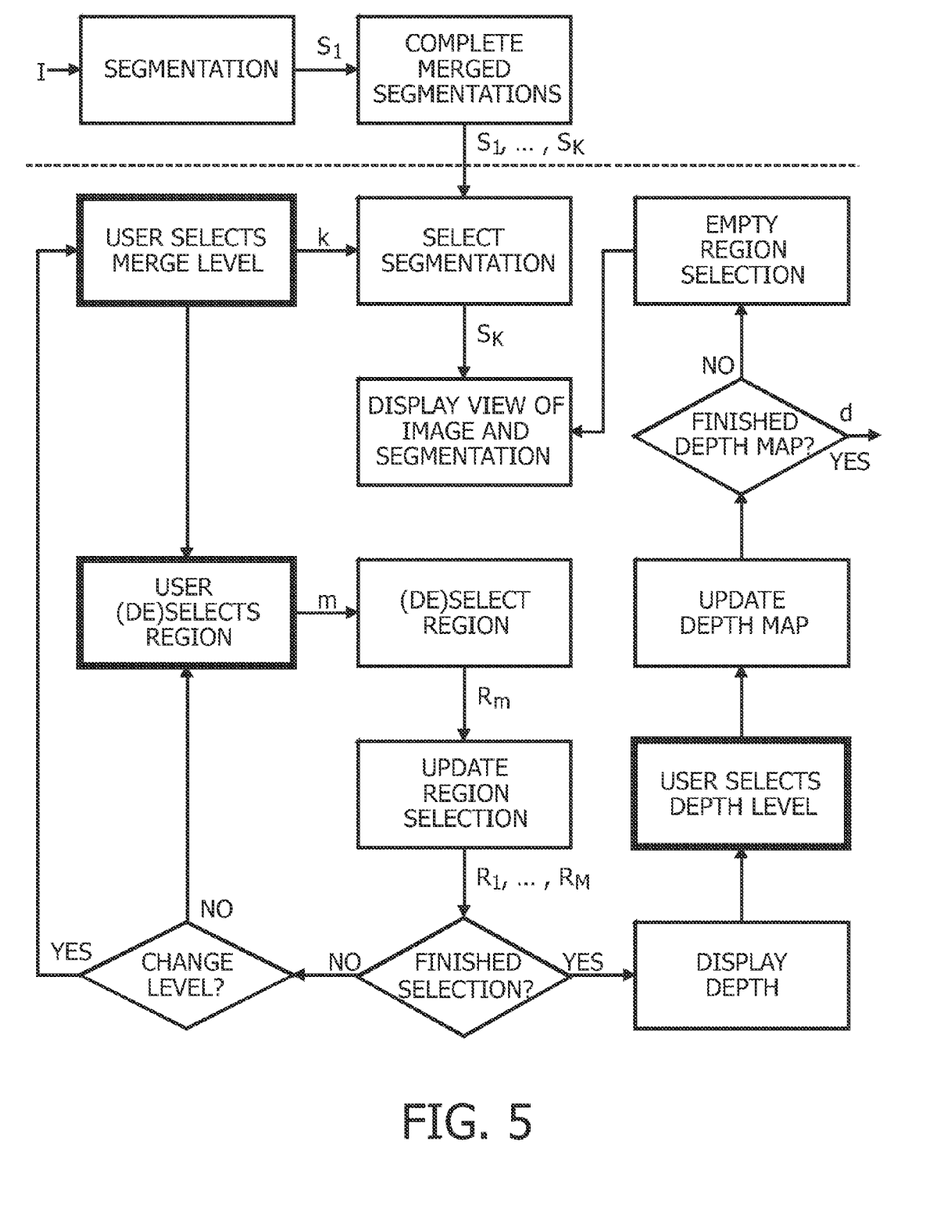
FIG. 5 is a flowchart of a method of processing image data.

FIG. 5 shows a flow chart for the operation of the depth editor with interactive segment merging. Above the broken line is the offline processing not visible to the user. Below the broken line is the interactive part of the system. Input to the editor is the image data I for which a depth map d will be constructed.

In the offline part, the region color segmentation $S_1$ is calculated. Preferably this is a so-called over-segmentation meaning that there are many more segments in the image than objects in the scene. This most basic color segmentation $S_1$ is then merged recursively based on region properties such as region size, region mean color, region texture, region motion, etc. The result of the first merge step is merged segmentation $S_2$. Based on $S_2$, the region properties such as region size, region mean color, region texture, region motion, etc. are recalculated and a new merged segmentation $S_2$ is calculated. This process is repeated until a given number K is reached. All segmentations $S_1$ to $S_K$ are stored. Next to these segmentations there is also computed and stored K edge maps that will be used in the online part for real-time edge display.

The online part starts by selecting an initial merge level segmentation and an initial background depth map. The initial merge level will default to the middle merge level. The initial background depth map is a constant background value or gradient that linearly varies depth as a function of height in the picture.

The image data is then displayed indicating segmentation edges using a contrast color, or other method of highlighting of the initial merge level, to provide a segmentation view. Next, the user selects a region by pointing at the screen and clicking the left mouse button. The selected region then becomes visible by setting the blue picture channel to 255 on the display. The region is automatically added to the current set of selected regions. If the user wants they can change the merge level and/or select a new region. By pressing the left arrow key the user selects a finer segmentation; by pressing the right arrow key the user selects a coarser segmentation. The user can deselect a region by clicking with the left mouse button on an already selected pixel in that region.

When the user has finished the region selection process they can show the depth map in the same window instead of the image by pressing the Tab key on the keyboard. The current depth map is then displayed together with the selected regions drawn in green color. The user can then select a depth level, which may be provided by a selection of one out of five depth levels by pressing the spacebar. The initial depth value is 255 and the depth level is decreased by 50 each time the user presses the spacebar. When the depth level is 5, then the next level becomes 255. The user can complete the process by pressing Enter which empties the current region selection and also saves the depth map, for example to disk. Switching back to the image is done by pressing the Tab key after which the user can make a new selection.

As has been mentioned above, one or more views 20 could be provided to the user that have been created using merging based on motion. When two consecutive image frames are available, motion estimation can help to group segments that are likely to belong to one and the same object. One way to achieve this is to first estimate motion using non-overlapping blocks of 16×16 pixels and a search window of 33×33 pixels. For each block there is selected the motion vector that results in the smallest sum of absolute differences (the absolute difference is summed over the red, green and blue color component). There is then produced a two-dimensional histogram with size 33×33 of the motion vectors. Each bin in the histogram contains a count of the number of times that the corresponding vector was found to be the best match for a particular block.

From this histogram it is then possible select the $N_{models}$ motion vectors that have the $N_{models}$ largest counts in the histogram. In one implementation it is desirable to use $N_{models} = 3$, but larger values for $N_{models}$ give useful output as well. The $N_{models}$ candidate motion vectors are then used to classify each segment of the input segmentation that must be merged based on motion. More specifically, for each segment in the input segmentation there is calculated the sum of absolute color differences over the pixels in the segment (the absolute difference is summed over the red, green and blue color component) for each of the motion vectors. The motion model that results in the smallest sum of absolute differences matches best and is thus assigned to the segment. Finally, to create the merged segmentation based on motion, spatially neighbouring segments that have the same motion model identifier are merged into a single segment in the output segmentation.

The above approach of using a limited number of pre-determined candidate motion models has the advantage that the solution is constrained to a limited number of possible motions. This is especially useful if the image has homogeneous color regions or noise or if segments are small. In that case, different motion vectors can give a similar small sum of absolute differences resulting in a noisy motion field on the basis of which it is difficult to merge spatially adjacent segments in a reliable manner. The use of motion and color as the segmentation criteria (with appropriate parameters set) allow the combining of two modalities in a single merge diagram. It will be clear to the skilled person that other segmentations can be made using motion related information.

Figure 6:
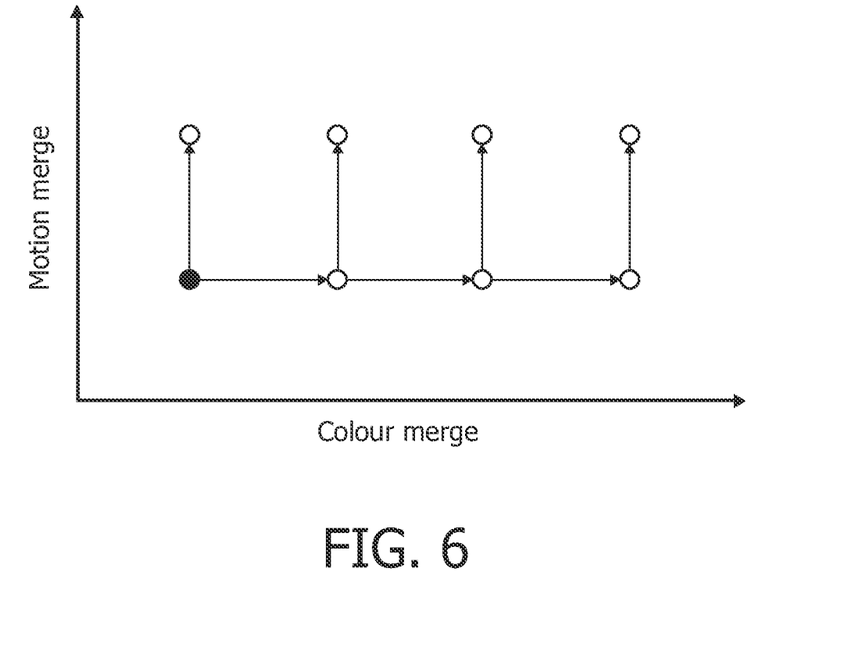
FIG. 6 is a diagram showing the relationship between different segmentation views.
Figure 7:
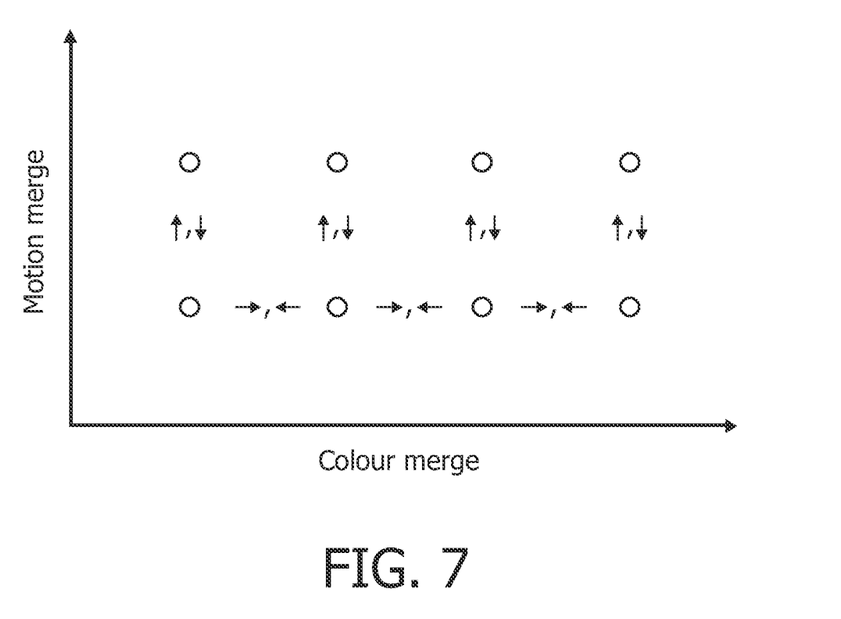
FIG. 7 is a diagram showing navigation between the views of FIG. 6.

FIG. 6 illustrates how two merge modalities can be used to produce eight different segmentations. In this embodiment, the modalities color and motion were used to produce the 'merge diagram'. FIG. 7 illustrates how the user can switch between different segmentations in the 'merge diagram'. In FIG. 6 there is illustrated how segmentations at different merge levels are created using two different merge modalities (in this case color and motion). Each circle in the 'merge diagram' represents a segmentation view and each arrow points into the direction of a merged segmentation. The start segmentation is indicated by the closed circle. This segmentation is once merged using color (in the x-axis direction) and a second time using motion (in the y-axis direction). The resulting merged segmentation that was based on color is then merged once using color and a second time using motion, etc.

In FIG. 7 there is shown how the user can switch between two different segmentation views in the 'merge diagram' using one of the four arrow keys on the keyboard. In fact using a set of dedicated keys arranged like e.g. a numeric key pad, it would be possible to actually navigate in more directions provided that such segmentations would be available. Alternatively or additionally an on-screen display of the merge diagram might be rendered facilitating navigation through the various segmented views. Even more alternatively mouse strokes or mouse gestures could be used for navigation.

Figure 8:
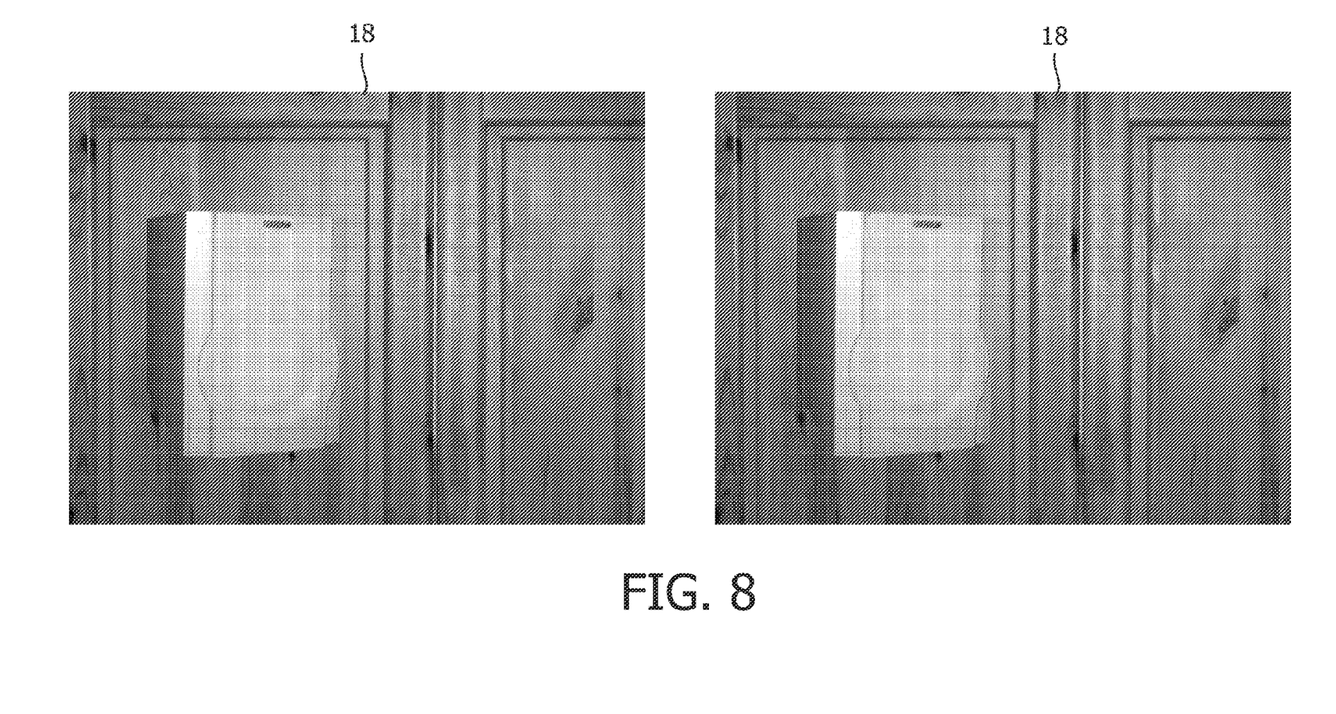
FIG. 8 is a diagram of two test frames of image data.

FIG. 8 shows two test images 18 that were created by compositing a foreground object (speaker) onto the same background. Motion was simulated by pasting the speaker onto the background at a different spatial location (right image) thereby introducing motion. The speaker in the foreground was photographed against a dark background, segmented out and pasted onto another picture. In the second picture, the speaker is moved to the right with respect to the first image. Note that the left image in FIG. 8 is presented to the user and segmented and the right image in FIG. 8 is only used as reference for the motion model calculation and motion model classification. It is not shown to the user. In an example using a video sequence of image frames, the two images 18 would be consecutive frames.

Figure 9:
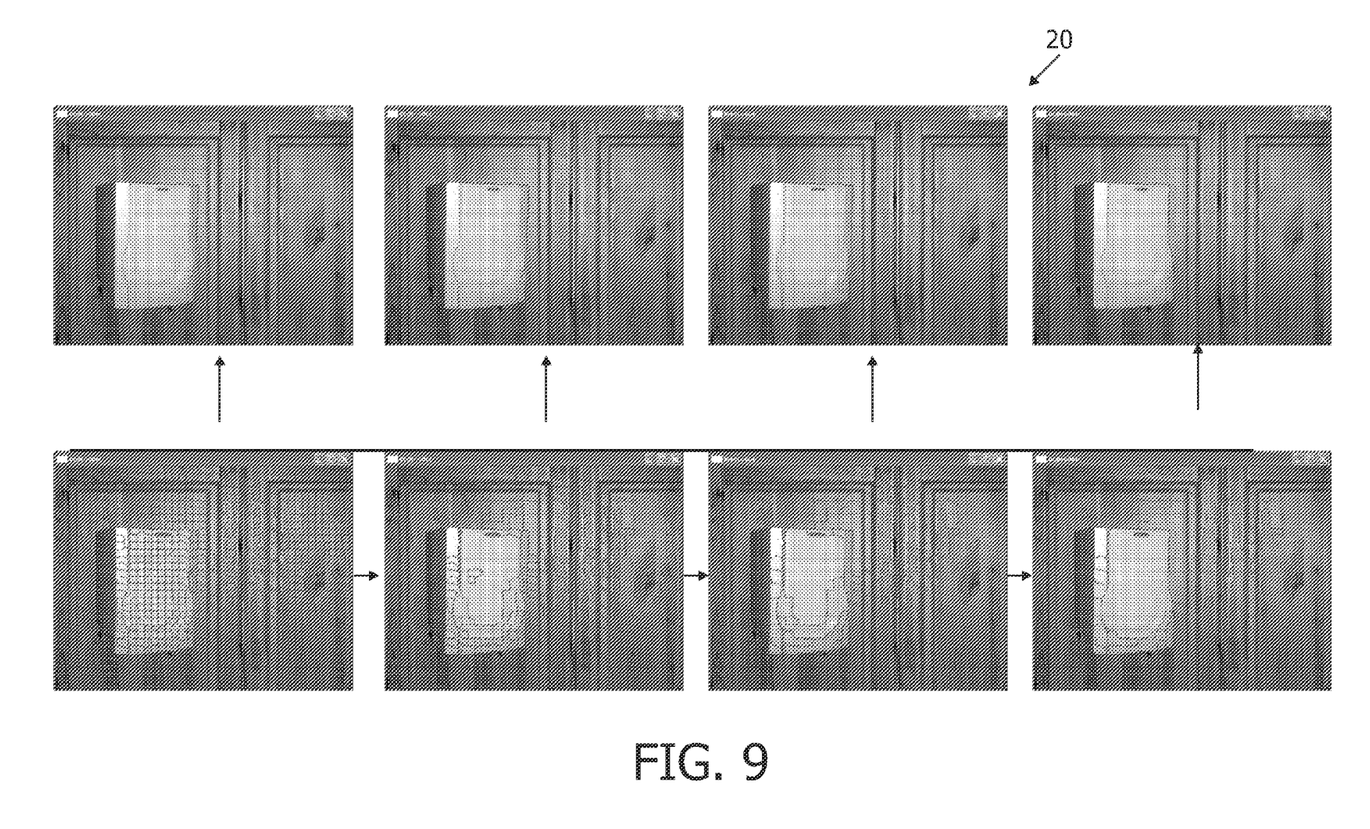
FIG. 9 is a diagram of eight segmentation views of the image data of FIG. 8.
Figure 10:
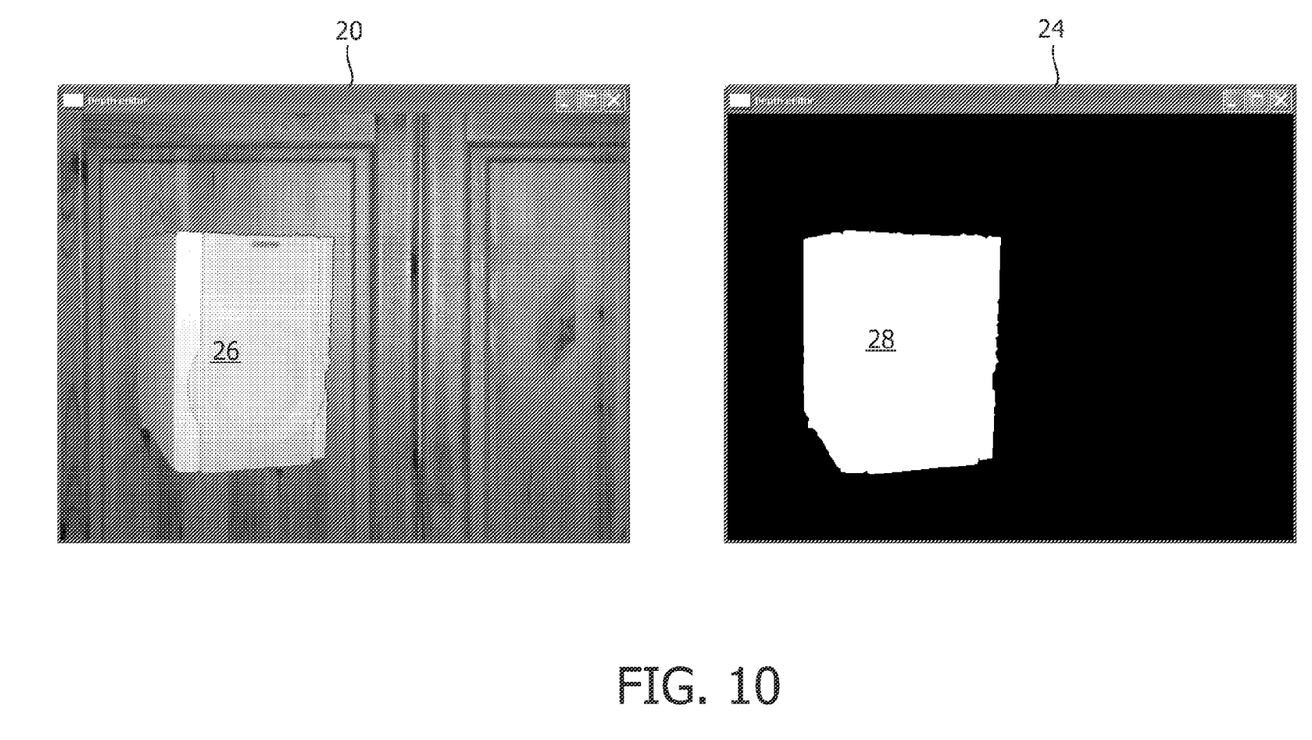
FIG. 10 is a schematic diagram of the image data of FIG. 8, and a corresponding depth map.

FIG. 9 shows all eight segmentation views 20 configured according to the merge diagrams of FIGS. 7 and 8. The eight segmentations are arranged according to the color and motion axes of the merge diagrams. Segments have been merged first horizontally based on color and then vertically based on motion. The left, right, bottom and up keys are used to navigate between these eight segmentations. It is clear that along the positive color merge axis, segments are merged and that along the positive motion axis segments are merged. While navigating quickly between these eight segmentations it becomes clear that two color based merging steps followed by a motion based merging step results in a single merged segment that selects the speaker. One mouse click in any segment area highlights the segment. After changing to the depth window by pressing the TAB key on the keyboard a depth value may be selected by pressing the space bar on the keyboard until the preferred depth is found. FIG. 10 shows the selected segment view 20 (left) and the final depth map 24 (right).

FIG. 10 illustrates the process of obtaining the depth map 24 from an input image 18. The Figure shows an initial merge level 20 and a user selected global depth profile, being a depth map 24. The display device 12 is arranged to display the depth map 24 alongside the segmented view 20 of the image data 18. The segmented view 20 can be considered to be the original image data 18 with a series of edges overlaid. These edges define the regions (or segments) that are an output of the segmentation algorithm. The depth map 24 starts by having no user defined data within it, at least at this point in the process. The tool is provided to enable a user to easily build up the depth map 24.

The user can then provide a selection user input, which selects a segment of the image data 18. The system has then transferred that region 26 to the depth map 24, as the depth region 28. The system receives a depth user input relating to the respective selection user input of the region 26, and the depth map 24 for the image data 18 is created accordingly. The user is selecting a depth value for the region that they have selected in the view 20. The user could select multiple regions from the view 20 if they wish. All of the selected views will then be transferred to the depth map 24, and the user can assign a depth value to those regions. Indeed different depth values could be selected for different regions that have been presently transferred into the depth map 24.

After a defined user input (such as through the dial 16) the user can switch to a different segmentation view. The user can change to a coarser merge level (granularity) and this enables the user to select further parts of the image 18 with multiple mouse clicks after which a depth value is assigned. The regions selected by the user are translated into components within the depth map 24. The user makes a depth input to assign a desired depth to the selected regions. This process will continue, with the user moving between segmentation levels, selecting one or more segments within the current view and then assigning depth values to the selected regions, to build up the depth map d. When the user has finished, then the depth map d will be the output of the image data processing.

The system and method described with reference to FIG. 10 describes that merged segmentations are created by recursively merging adjacent regions based on color distance. However, this segmentation criterion does limit the choice of region properties. Criteria other than color distance can be used. For instance, a little more elaborate approach would be to select the 10% smallest regions and merge each of these with their neighbour region that is most similar in color. Also motion information with respect to a second image could be used to create merged segmentations. Segments can then be merged on motion similarity.

Image segmentation is a known technique. The text above gives a reference for a region fitting segmentation algorithm described in Richard O. Duda, Peter E. Hart, and David G. Stork "Pattern Classification", John Wiley and Sons, Inc., New York, 2001 and C. Oliver, S. Quegan "Understanding Synthetic Aperture Radar Images". The Duda Reference, at pages 548 and 549 derives equations for a simple and efficient update of the error criterion when one sample is moved from one segment to another segment during an iterative fitting process. This iterative fitting method can be applied to generate the first (non-merged) segmentation in the above process. Note that the region fitting also enforces segment boundaries to be smooth using a measure presented in the Oliver reference. Iterative region fitting with boundary smoothness gives acceptable results. However, sometimes long elongated regions are formed along blurred object edges. This segmentation can therefore be improved by using "false edge removal" between two region fitting steps. The idea of using false edge removal between two region fitting steps is described in an earlier patent application publication WO 2004/051573, entitled "Method and apparatus for removing false edges from a segmented image".

As a general rule, any suitable segmentation algorithm can be used that will divide up the original image data into smaller segments/regions. All that is necessary is that the granularity of segmentation can be adjusted to produce different segmentation views, by adjustment of a parameter. These different views are then available to a user who can switch between them and select different segments at different levels for their current task, such as creating a depth map.

As indicated above the present invention can also be used for selecting objects, regions in other graphical applications such as rotoscoping, image restoration, movie coloring or in graphical editors. In order to visualize the selection selected segments are preferably colorized and/or outlined using a contrast color throughout the selection process.

Although the above has been explained primarily with regard to images from image sequences, the present invention may also be used with equal advantage for annotating depth maps to still images. Provided that the still image is derived from an image sequence it might still be possible to use a motion cue for segmentation. It is however noted that in case only a single still is available, there is no motion cue, in such a situation other cues such as luminance, chrominance and/or texture may be used to segment the image data. It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

Use of the verb "to comprise" and its conjugations does not exclude the presence of elements other than those stated in the claims. Use of the article "a" or "an" preceding an element does not exclude the presence of a plurality of such elements.

The invention claimed is:

1. A method of processing image data by a processor, the method comprising acts of:
   segmenting the image data on the processor to create first and second segmented views using a first criterion and a first parameter, and using the first criterion or a second criterion and a second parameter, respectively;
   selecting one or more segments of the image data, as displayed in one of the first and second segmented views, the selecting is achieved via user interface; and
   displaying the selected segments on a display terminal.

2. The method according to claim 1, further comprising an act of combining the one or more selected segments from the first segmented view with the one or more selected segments from the second segmented view.

3. The method according to claim 1, further comprising an act of receiving a defined user input after selecting segments from the first segmented view, the defined user input triggering displaying the second segmented view.

4. The method according to claim 1, further comprising an act of continuously visualizing an outline of combined selected image segments in the segmented view.

5. The method according to claim 1, further comprising acts of:
   receiving one or more depth user inputs, relating to a respective selection user input; and
   creating a depth map for the image data based on the received one or more depth user inputs.

6. The method according to claim 5, further comprising an act of displaying the depth map alongside a segmented view of the image data.

7. The method according to claim 1, wherein the second segmented view is based on the first criterion, and further comprising acts of:
   segmenting the image data using a second criterion and a third parameter to create a third segmented view of the image data; and
   selecting via the interface one or more segments of the image data, as displayed in the third segmented view.

8. The method according to claim 1, further comprising acts of:
   receiving a merge user input; and
   merging the segments of the image data defined by a user input selecting segments of the image data.

9. The method according to claim 1, wherein the criterion is selected from at least one of color, segment size, luminance, chrominance, motion and texture.

10. A system for processing image data comprising:
    a processor configured to segment the image data to create first and second segmented views using a first criterion and a first parameter, and using first criterion or a second criterion and a second parameter, respectively;
    a user interface for selecting one or more segments of the image data, as displayed in one of the first and second segmented views; and
    a display device for displaying selected segments.

11. The system according to claim 10, wherein the user interface is further configured to receive one or more depth user inputs relating to a respective selection user input, and the processor is further configured to create a depth map for the image data.

12. The system according to claim 11, wherein the display device is further configured to display the depth map alongside a segmented view of the image data.

13. The system according to claim 10 wherein
    the second segmented view is based on the first criterion, and wherein the processor is further configured to segment the image data using a second criterion and a third parameter to create a third segmented view of the image data,
    the display device is further configured to display the third segmented view of the image data, and
    the user interface is further configured to receive one or more further selection user inputs selecting one or more segments of the image data, as displayed in the third segmented view.

14. A computer program product on a computer readable medium that when executed by a processor performs a method of processing image data, the method comprising acts of:
- segmenting the image data to create first and second segmented views using a first criterion and a first parameter, and using the first criterion or a second criterion and a second parameter respectively;
- selecting one or more segments of the image data, as displayed in one of the first and second segmented views, the selecting is achieved via an interface; and
- displaying the selected segments on a display terminal.

15. The computer program product according to claim 14, further comprising acts of
- receiving one or more depth user inputs, relating to a respective selection user input; and
- creating a depth map for the image data based on the received one or more depth user inputs.

16. The computer program product according to claim 15, further comprising an act of displaying the depth map alongside a segmented view of the image data.

17. The computer program product according to claim 14, wherein the second segmented view is based on the first criterion, and further comprising acts of:
- segmenting the image data using a second criterion and a third parameter to create a third segmented view of the image data,
- displaying the third segmented view of the image data, and
- receiving one or more further selection user inputs selecting one or more segments of the image data, as displayed in the third segmented view.

18. The computer program product according to claim 14, and further comprising acts of receiving a merge user input, and merging the segments of the image data defined by a user input selecting segments of the image data.

19. Apparatus for processing image data comprising:
- a processor configured to segment the image data to create first and second segmented views using a first criterion and a first parameter, and using the first criterion or a second criterion and a second parameter, respectively;
- an input for receiving a user selection of one or more segments of the image data, from one of the first and second segmented views; and
- an output for providing the selected segments for display.

20. The apparatus according to claim 19, wherein the input is for receiving one or more depth user inputs, the depth user inputs relating to respective selection user inputs, and the processor is further configured to create a depth map for the image data.

21. The apparatus according to claim 19, wherein the output provides depth map along with a segmented view of the image data.

22. The apparatus according to claim 19 wherein
- the second segmented view is based on the first criterion, and wherein the processor is further configured to segment the image data using a second criterion and a third parameter to create a third segmented view of the image data,
- the output provides the third segmented view of the image data for display, and
- the input is for receiving one or more further selection user inputs for selecting one or more segments of the image data from the third segmented view.

23. A non-transitory computer readable medium having program means for controlling a processor, to perform the method comprising:
- using a processor to segment image data to create first and second segmented views, the processer using a first criterion and a first parameter to create the first segmented view, and the processor using the first criterion or a second criterion and a second parameter to create the second segmented view;
- outputting through the output the first or second segmented view for display,
- receiving from an input a selection of one or more segments of the image data, from one of the first and second segmented views, and
- outputting through an output the selected segments for display.

* * * * *